United States Patent
Meyhofer et al.

(10) Patent No.: US 10,479,376 B2
(45) Date of Patent: Nov. 19, 2019

(54) DYNAMIC SENSOR SELECTION FOR SELF-DRIVING VEHICLES

(71) Applicant: UATC, LLC, San Francisco, CA (US)

(72) Inventors: Eric Meyhofer, Pittsburgh, PA (US); David Rice, Pittsburgh, PA (US); Scott Boehmke, Pittsburgh, PA (US); Carl Wellington, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 74 days.

(21) Appl. No.: 15/467,525

(22) Filed: Mar. 23, 2017

(65) Prior Publication Data
US 2018/0272963 A1  Sep. 27, 2018

(51) Int. Cl.
| | |
|---|---|
| *B60W 50/023* | (2012.01) |
| *G05D 1/02* | (2006.01) |
| *G01S 17/93* | (2006.01) |
| *G01S 13/86* | (2006.01) |
| *G01S 13/93* | (2006.01) |
| *G01C 21/30* | (2006.01) |

(52) U.S. Cl.
CPC ......... *B60W 50/023* (2013.01); *G01S 13/862* (2013.01); *G01S 13/865* (2013.01); *G01S 13/867* (2013.01); *G01S 13/931* (2013.01); *G01S 17/936* (2013.01); *G05D 1/024* (2013.01); *G05D 1/0251* (2013.01); *G01C 21/30* (2013.01); *G01S 2013/936* (2013.01); *G01S 2013/9353* (2013.01); *G01S 2013/9357* (2013.01); *G05D 2201/0213* (2013.01)

(58) Field of Classification Search
CPC ........... B60R 16/0231; B60R 16/0237; B60W 50/023; G01C 21/20; G05D 1/0088
USPC .............................. 701/23, 25; 382/106, 154
See application file for complete search history.

(56) References Cited

U.S. PATENT DOCUMENTS

| | | | |
|---|---|---|---|
| 5,012,745 | A | 5/1991 | Yamashita |
| 5,590,604 | A | 1/1997 | Lund |
| 5,598,783 | A | 2/1997 | Lund |
| 6,122,040 | A | 9/2000 | Arita |
| 6,657,705 | B2 | 12/2003 | Sano |
| 6,827,265 | B2 | 12/2004 | Knowles |

(Continued)

FOREIGN PATENT DOCUMENTS

| | | |
|---|---|---|
| CN | 102494609 | 6/2012 |
| CN | 101959022 | 11/2012 |

(Continued)

OTHER PUBLICATIONS

Office Action in CA2,902,430 dated Dec. 15, 2017.

(Continued)

*Primary Examiner* — Thomas G Black
*Assistant Examiner* — Wae L Louie
(74) *Attorney, Agent, or Firm* — Dority & Manning, P.A.

(57) ABSTRACT

A self-driving vehicle (SDV) can operate by analyzing sensor data to autonomously control acceleration, braking, and steering systems of the SDV along a current route. The SDV includes a number of sensors generating the sensor data and a control system to detect conditions relating to the operation of the SDV, such as vehicle speed and local weather, select a set of sensors based on the detected conditions, and prioritize the sensor data generated from the selected set of sensors to control aspects relating to the operation of the SDV.

20 Claims, 5 Drawing Sheets

(56) References Cited

U.S. PATENT DOCUMENTS

| | | | |
|---|---|---|---|
| 6,860,350 B2 | 3/2005 | Beuhler | |
| 6,956,227 B2 | 10/2005 | Miyazaki | |
| 7,248,342 B1 | 7/2007 | Degnan | |
| 7,650,239 B2 | 1/2010 | Samukawa | |
| 7,961,301 B2 | 6/2011 | Earhart | |
| 8,208,716 B2 * | 6/2012 | Choi | G06T 7/593 |
| | | | 382/106 |
| 8,344,940 B2 | 1/2013 | Jeong | |
| 8,767,186 B2 | 7/2014 | Lu | |
| 8,797,828 B1 | 8/2014 | Lev | |
| 8,899,903 B1 | 12/2014 | Saad | |
| 8,909,375 B2 | 12/2014 | Larson | |
| 8,994,581 B1 | 3/2015 | Brown | |
| 9,126,595 B2 | 9/2015 | Seo | |
| 9,201,424 B1 | 12/2015 | Ogale | |
| 9,224,053 B1 | 12/2015 | Ferguson | |
| 9,231,998 B2 | 1/2016 | Lu et al. | |
| 9,328,526 B2 | 5/2016 | Shani | |
| 9,383,753 B1 | 7/2016 | Templeton | |
| 9,453,914 B2 | 9/2016 | Stettner | |
| 9,529,079 B1 | 12/2016 | Droz | |
| 9,625,582 B2 | 4/2017 | Gruver | |
| 9,637,118 B2 | 5/2017 | Yokota | |
| 9,669,827 B1 * | 6/2017 | Ferguson | B60W 30/09 |
| 9,696,722 B1 | 7/2017 | Ulrich | |
| 9,719,801 B1 * | 8/2017 | Ferguson | G01C 25/00 |
| 9,720,415 B2 | 8/2017 | Levinson | |
| 9,823,353 B2 | 11/2017 | Eichenholz | |
| 9,840,256 B1 | 12/2017 | Valois | |
| 9,841,495 B2 | 12/2017 | Campbell | |
| 9,841,763 B1 | 12/2017 | Valois | |
| 9,857,468 B1 | 1/2018 | Eichenholz | |
| 9,869,753 B2 | 1/2018 | Eldada | |
| 9,869,754 B1 | 1/2018 | Campbell | |
| 9,874,635 B1 | 1/2018 | Eichenholz | |
| 9,880,263 B2 | 1/2018 | Droz | |
| 9,897,687 B1 | 2/2018 | Campbell | |
| 2002/0135468 A1 | 9/2002 | Bos et al. | |
| 2004/0030474 A1 | 2/2004 | Samuel | |
| 2004/0148093 A1 | 7/2004 | Tanaka | |
| 2005/0095092 A1 | 5/2005 | Segal | |
| 2005/0185846 A1 | 8/2005 | Luo | |
| 2005/0196015 A1 | 9/2005 | Luo | |
| 2005/0196035 A1 | 9/2005 | Luo | |
| 2006/0089765 A1 * | 4/2006 | Pack | G05D 1/0061 |
| | | | 701/23 |
| 2007/0200064 A1 | 8/2007 | Remillard | |
| 2007/0219720 A1 | 9/2007 | Trepagnier | |
| 2008/0002427 A1 | 1/2008 | Kropac | |
| 2008/0039991 A1 | 2/2008 | May | |
| 2008/0161986 A1 | 7/2008 | Breed | |
| 2009/0312906 A1 | 12/2009 | Bauer | |
| 2009/0319112 A1 * | 12/2009 | Fregene | B60W 30/16 |
| | | | 701/25 |
| 2010/0013615 A1 * | 1/2010 | Hebert | B60Q 9/006 |
| | | | 340/425.5 |
| 2010/0020306 A1 | 1/2010 | Hall | |
| 2010/0053715 A1 | 3/2010 | O'Neill | |
| 2010/0110192 A1 | 5/2010 | Johnston | |
| 2010/0185353 A1 | 7/2010 | Barwick | |
| 2010/0194890 A1 | 8/2010 | Weller | |
| 2010/0208034 A1 | 8/2010 | Chen | |
| 2010/0208244 A1 | 8/2010 | Earhart | |
| 2011/0050855 A1 | 3/2011 | Nobis et al. | |
| 2011/0134249 A1 | 6/2011 | Wood | |
| 2011/0166757 A1 | 7/2011 | Otanez | |
| 2011/0184605 A1 * | 7/2011 | Neff | G05D 1/0231 |
| | | | 701/25 |
| 2011/0241845 A1 | 10/2011 | Sullivan | |
| 2011/0245964 A1 | 10/2011 | Sullivan | |
| 2011/0301785 A1 | 12/2011 | Allis | |
| 2011/0317993 A1 | 12/2011 | Weissler | |
| 2012/0008129 A1 | 1/2012 | Lu | |
| 2012/0033196 A1 | 2/2012 | Vanek | |
| 2012/0154785 A1 | 6/2012 | Gilliland | |
| 2012/0239238 A1 | 9/2012 | Harvey | |
| 2013/0078063 A1 | 3/2013 | Shanil | |
| 2013/0166105 A1 | 6/2013 | Wastel | |
| 2013/0190963 A1 | 7/2013 | Kuss | |
| 2013/0226431 A1 * | 8/2013 | Lu | B60W 50/0098 |
| | | | 701/96 |
| 2013/0317649 A1 | 11/2013 | Larson | |
| 2014/0041966 A1 | 2/2014 | Healy | |
| 2014/0136414 A1 | 5/2014 | Abhyanker | |
| 2014/0277691 A1 | 9/2014 | Jacobus | |
| 2014/0286744 A1 | 9/2014 | Shani | |
| 2015/0202939 A1 | 7/2015 | Stettner | |
| 2015/0293225 A1 | 10/2015 | Riley | |
| 2015/0334269 A1 | 11/2015 | Yokota | |
| 2016/0003946 A1 | 1/2016 | Gilliland | |
| 2016/0129917 A1 | 5/2016 | Gariepy | |
| 2016/0223671 A1 | 8/2016 | Thayer | |
| 2016/0231746 A1 | 8/2016 | Hazelton et al. | |
| 2016/0291134 A1 | 10/2016 | Droz | |
| 2016/0318415 A1 | 11/2016 | Salasoo | |
| 2016/0349746 A1 | 12/2016 | Grau | |
| 2017/0096138 A1 | 4/2017 | Reiff | |
| 2017/0168146 A1 | 6/2017 | Boehmke | |
| 2017/0184399 A1 | 6/2017 | Thayer | |
| 2017/0226765 A1 | 8/2017 | Wastel | |
| 2017/0357260 A1 | 12/2017 | Gilliland | |
| 2018/0070804 A1 | 3/2018 | Tesar | |
| 2018/0149732 A1 | 5/2018 | Droz | |

FOREIGN PATENT DOCUMENTS

| | | |
|---|---|---|
| CN | 103152518 | 6/2013 |
| CN | 103179339 | 6/2013 |
| CN | 203353019 | 12/2013 |
| CN | 103001428 | 5/2015 |
| CN | 102857592 | 12/2015 |
| CN | 103146355 | 2/2016 |
| EP | 1816514 | 8/2017 |
| JP | H09163197 | 12/1998 |
| JP | H09326032 | 6/1999 |
| JP | 2011088623 | 4/2001 |
| JP | 2005024463 | 1/2005 |
| JP | 2011123078 | 12/2010 |
| RU | 2493988 | 9/2013 |
| RU | 2012154453 | 6/2014 |
| RU | 2014146890 | 6/2016 |
| WO | PCT/JP2014/053408 | 3/2014 |

OTHER PUBLICATIONS

Office Action in JP 2016-502343 dated Jan. 18, 2018.
Office Action in CN201480022190.5 dated Aug. 22, 2017.
ISR and Written Opinion in PCT/US2018/023885 dated Aug. 16, 2018.

* cited by examiner

DYNAMIC SENSOR SELECTION FOR SELF-DRIVING VEHICLES

BACKGROUND

Autonomous vehicles currently exist in experimental and prototype forms. These vehicles replace human drivers with sensors and computer-implemented intelligence. Under existing technology, autonomous vehicles can readily handle driving with other vehicles on roadways. However, various environmental and operating conditions can affect the quality and reliability of the sensors, which poses challenges to autonomous vehicles.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
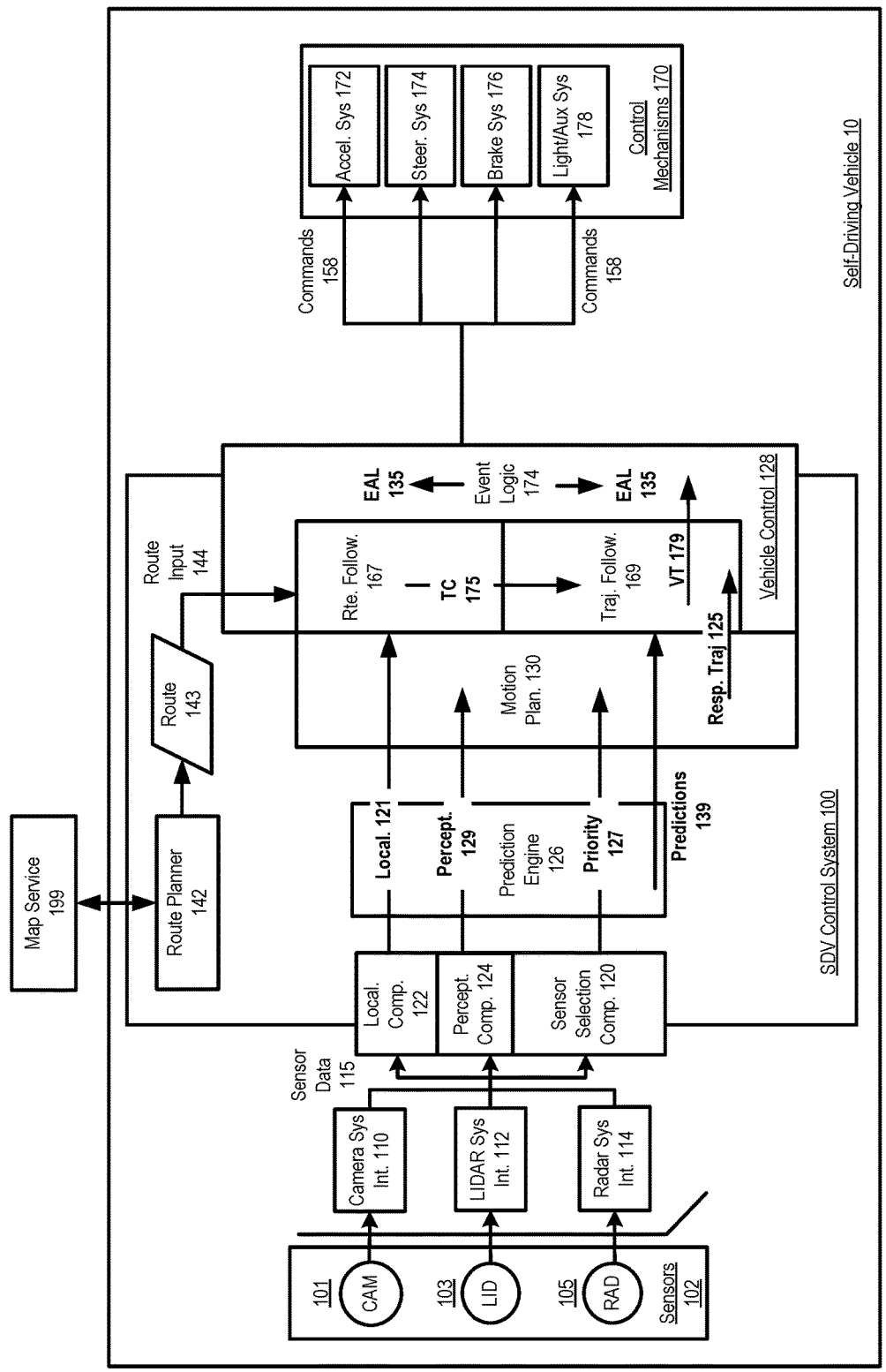
FIG. 1 is a block diagram illustrating an example self-driving vehicle operated by a control system implementing a sensor selection component, as described herein.

A self-driving vehicle (SDV) can include a control system and a sensor array, which generates a live sensor view of a surrounding area of the SDV. In various implementations, the control system can dynamically analyze the sensor view of the surrounding area and a road network map (e.g., a highly detailed localization map) in order to autonomously operate the acceleration, braking, and steering systems along a current route to a destination.

In some examples, the sensor array includes sensors of various types, such as LIDAR, radar, ultrasonic sensors, and cameras, each of which have their own strengths that can compensate for the weaknesses of other sensors. Examples recognize that certain operating conditions present significant challenges to self-driving vehicles. In particular, weather such as fog, mist, rain, or snow can impair the ability of some of the sensors to collect sensor data with sufficient accuracy to reliably navigate the SDV through an environment. In addition, as the SDV increases in speed while driving, there is less time to detect and avoid potential hazards safely or comfortably. Although some of the sensors may offer superior performance in good weather conditions or at slower speeds, it is important for the SDV to recognize adverse conditions and analyze sensor data with those conditions and the performance characteristics of the sensors in mind. Accordingly, examples provide for an SDV that is equipped with a sensor array and control system that includes logic to prioritize the use of particular sensors over others based on predetermined conditions. In addition, each type of sensor and its supporting interface, software, and firmware can be designed, equipped, or tuned to maximize that sensor's strengths since a different sensor or set of sensors are available to provide accurate sensor data in conditions where the first sensor is less reliable. For example, LIDAR sensors can be optimized to function at low to moderate vehicle speeds on an SDV equipped with radar and stereo cameras that are optimized to function at higher speeds.

A sensor selection component detects conditions which have a bearing on the performance characteristics of the sensors and other conditions that may influence the importance of sensor data from one sensor over another. In addition, the sensor selection component prioritizes, through either a weighting or selection process, each of the sensors using a set of sensor priority rules that are based on expected performance characteristics of each of the sensors in the detected conditions. These performance characteristics can be determined from a combination of technical specifications for the sensors and testing performed with each of the sensors in the relevant conditions. Components of the SDV control system can use the resulting sensor priority to weight or select sensor data when analyzing the current sensor state to perform vehicle operations.

Conditions which have a bearing on the performance characteristics of the sensors of the SDV or that may influence the importance of sensor data can include operating parameters of the SDV itself and the state of the surrounding environment, such as the weather and current road conditions. Some examples of operating parameters of the SDV are the speed of the vehicle, acceleration, direction of movement (i.e., forward or reverse), traction, sensor status, and vehicle status (i.e., parked or moving). Some examples of environment conditions are current precipitation type and magnitude (e.g., heavy rain or light snow), fog, smog, haze, leaves, wind, time of day, ambient lighting, road surface type and quality, and traffic.

Self-driving vehicles tend to be cautious and deliberate. When self-driving vehicles are used to carry passengers, for example, the SDV may implement sensor analysis components to repeatedly analyze perceived objects and conditions. For safety, self-driving vehicles slow down or brake to evaluate unknown objects or conditions, or to select a response action when the best response action is not known with sufficient confidence. The result is that the SDV may tend to slow, stop, and resume driving on a trip, making the ride less enjoyable and uncomfortable. Examples further recognize, however, that if the sensor analysis components can recognize objects or conditions faster and more reliably regardless of current conditions, the SDV will have less variation in braking events (e.g., to reduce speed or come to stop). The reduction in braking events can make the SDV more suitable for carrying passengers, as reduction in braking events makes the passenger ride in the vehicle more comfortable.

Among other benefits, the examples described herein achieve a technical effect of providing a sensor view around a self-driving vehicle in a way that optimizes the accuracy of the sensor view regardless of environment and operating conditions affecting the self-driving vehicle.

In one aspect, a self-driving vehicle (SDV) includes a number of sensors generating sensor data and a control system to detect conditions relating to an operation of the SDV, select a set of sensors from the number of sensors based on the detected conditions, and prioritize the sensor data generated from the selected set of sensors to control aspects relating to the operation of the SDV.

In some implementations, the SDV receives contextual information from a network service over a network. In some implementations, the control system detects the conditions by analyzing the sensor data, and the conditions relating to the operation of the SDV include weather conditions, current speed of the SDV, time of day, ambient lighting, and road conditions.

In some aspects, a number of sensor priority rules are applied to the detected conditions to select the set of sensors. The sensor priority rules include weights to apply to the sensor data from the number of sensors, and the control system prioritizes the sensor data based on the weights. In addition, the sensor priority rules and/or weights can be based on performance characteristics of each of the sensors in the detected conditions, and aspects relating to the operation of the SDV include detecting objects in an environment around the SDV.

In one example, the control system prioritizes the sensor data generated from the selected set of sensors to assign an object classification to each of the objects, and aspects relating to the operation of the SDV can include localization, prediction, and motion planning.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the terms "autonomous vehicle" (AV) or "self-driving vehicle" (SDV) may be used interchangeably to describe any vehicle operating in a state of autonomous control with respect to acceleration, steering, and braking. Different levels of autonomy may exist with respect to AVs and SDVs. For example, some vehicles may enable autonomous control in limited scenarios, such as on highways. More advanced AVs and SDVs can operate in a variety of traffic environments without any human assistance. Accordingly, an "AV control system" can process sensor data from the AV or SDV's sensor array, and modulate acceleration, steering, and braking inputs to safely drive the AV or SDV along a given route.

System Description

FIG. 1 is a block diagram illustrating an example self-driving vehicle operated by a control system with a sensor selection component, as described herein. In an example of FIG. 1, a control system 100 can autonomously operate the SDV 10 in a given geographic region for a variety of purposes, including transport services (e.g., transport of humans, delivery services, etc.). In examples described, the SDV 10 can operate without human control. For example, the SDV 10 can autonomously steer, accelerate, shift, brake, and operate lighting components. Some variations also recognize that the SDV 10 can switch between an autonomous mode, in which the SDV control system 100 autonomously operates the SDV 10, and a manual mode in which a driver takes over manual control of the acceleration system, steering system, braking system, and lighting and auxiliary systems (e.g., directional signals and headlights).

According to some examples, the control system 100 can utilize specific sensor resources in order to autonomously operate the SDV 10 in a variety of driving environments and conditions. For example, the control system 100 can operate the SDV 10 by autonomously operating the steering, acceleration, and braking systems of the SDV 10 to a specified destination. The control system 100 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 100 includes computational resources (e.g., processing cores and/or field programmable gate arrays (FPGAs)) which operate to process sensor data 115 received from sensors 102 of the SDV 10 that provide a sensor view of a road segment upon which the SDV 10 operates. The sensor data 115 can be used to determine actions which are to be performed by the SDV 10 in order for the SDV 10 to continue on a route to a destination. In some variations, the control system 100 can include other functionality, such as wireless communication capabilities using a communication interface to send and/or receive wireless communications over networks with one or more remote sources (e.g., a map service 199). In controlling the SDV 10, the control system 100 can generate commands 158 to control the various control mechanisms of the SDV 10, including acceleration, braking, steering, and auxiliary behaviors (e.g., lights and directional signals).

The SDV 10 can be equipped with multiple types of sensors 102 which can combine to provide a computerized perception of the space and the physical environment surrounding the SDV 10. Likewise, the control system 100 can operate within the SDV 10 to receive sensor data 115 from the collection of sensors 102 and to control the various control mechanisms 170 in order to autonomously operate the SDV 10. For example, the control system 100 can analyze the sensor data 115 to generate low level commands 158 executable by the acceleration system 172, steering system 157, and braking system 176 of the SDV 10. Execution of the commands 158 by the control mechanisms 170 can result in throttle inputs, braking inputs, and steering inputs that collectively cause the SDV 10 to operate along sequential road segments to a particular destination.

In more detail, the sensors 102 operate to collectively obtain a sensor view for the SDV 10 (e.g., in a forward operational direction, or providing a 360 degree sensor view), and further to obtain situational information proximate to the SDV 10, including any potential hazards or obstacles. By way of example, the sensors 102 can include multiple sets of camera systems 101 (video cameras, stereoscopic cameras or depth perception cameras, long range monocular cameras), LIDAR systems 103, one or more radar systems 105, and various other sensor resources such as sonar, ultrasonic sensors, proximity sensors, infrared sensors, wheel speed sensors, rain sensors, and the like. According to examples provided herein, the sensors 102 can be arranged or grouped in a sensor system or array (e.g., in a sensor pod mounted to the roof of the SDV 10) comprising any number of LIDAR, radar, monocular camera, stereoscopic camera, sonar, infrared, or other active or passive sensor systems.

Each of the sensors 102 can communicate with the control system 100 utilizing a corresponding sensor interface 110, 112, 114. Each of the sensor interfaces 110, 112, 114 can include, for example, hardware and/or other logical components which are coupled or otherwise provided with the respective sensor. For example, the sensors 102 can include a video camera and/or stereoscopic camera system 101 which continually generates image data of the physical environment around the SDV 10. The camera system 101 can provide the image data for the control system 100 via a camera system interface 110. Likewise, the LIDAR system 103 can provide LIDAR data to the control system 100 via a LIDAR system interface 112. Furthermore, as provided herein, radar data from the radar system 105 of the SDV 10 can be provided to the control system 100 via a radar system interface 114. In some examples, the sensor interfaces 110, 112, 114 can include dedicated processing resources, such as provided with field programmable gate arrays (FPGAs) which can, for example, receive and/or preprocess raw image data from the camera sensor.

In some aspects, the sensors 102 collectively provide sensor data 115 to various components of the control system 100, including a localization component 122, a perception component 124, and a sensor selection component 120. The control system 100 may also include a route planner 142, motion planning component 130, event logic 174, prediction engine 126, and a vehicle control interface 128. In the example illustrated, the localization component 122, perception component 124, and sensor selection component 120 are shown as sub-components of the control system 100. In variations, the functionality of these components can be distributed among other components in the SDV 10.

The localization component 122, perception component 124, and sensor selection component 120 can utilize a current sensor state of the SDV 10, as provided by sensor data 115, and can access a database of stored localization maps of the given region in which the SDV 10 operates. The localization maps can comprise highly detailed ground truth data of each road segment of the given region. For example, the localization maps can comprise prerecorded data (e.g., sensor data including image data, LIDAR data, and the like) by specialized mapping vehicles or other SDVs with recording sensors and equipment, and can be processed to pinpoint various objects of interest (e.g., traffic signals, road signs, and other static objects). As the SDV 10 travels along a given route, components of the control system 100 can access a current localization map of a current road segment to compare the details of the current localization map with the sensor data 115 in order to detect and classify any objects of interest, such as moving vehicles, pedestrians, bicyclists, and the like.

The sensor selection component 120 represents logic that prioritizes the processing or use of sensor data 115 by type (e.g., by sensor device) based on a predetermined condition or set of conditions. In some examples, the predetermined condition or set of conditions may relate to the operation of the SDV, and include for example, (i) telemetry information of the vehicle, including a velocity or acceleration of the vehicle; (ii) environment conditions in the region above the roadway, such as whether active precipitation (e.g., rainfall or snow fall) or fog is present; (iii) environment conditions that affect the roadway surface, including the presence of precipitation (e.g., soft rain, hard rain, light snowfall, active snowfall, ice); and/or (iv) the type of roadway in use by the vehicle (e.g., highway, main thoroughfare, residential road). The sensor selection component 120 may be implemented either as discrete logic or as logic distributed with specific processes (e.g., motion planning). The sensor selection component 120 prioritizes the processing and/or use of sensor data 115 by (i) selecting one type of sensor data to the exclusion of another type of sensor data, and/or (ii) weighting sensor data by type so that sensor type may influence a determination of the SDV control system 100. Still further, in some examples, the sensor selection component 120 may operate subject to priority rules, which may cause the SDV control system 100 to perform an action or otherwise utilize a particular type of sensor when a particular condition is present (e.g., if the camera detects a hazard in the road, the vehicle performs an avoidance action regardless of whether other sensors conflict with the detected perception).

Examples recognize that certain operating conditions present significant challenges to self-driving vehicles. In particular, weather such as fog, mist, rain, or snow can impair the ability of some of the sensors 102 to collect sensor data 115 with sufficient accuracy to reliably navigate the SDV 10 through an environment. In addition, as the SDV 10 increases in speed while driving, there is less time to detect and avoid potential hazards safely or comfortably. Although some of the sensors 102 may offer superior performance in good weather conditions or at slower speeds, it is important for the SDV 10 to recognize adverse conditions and analyze sensor data 115 with those conditions and the performance characteristics of the sensors 102 in mind. Therefore, a sensor selection component 120 detects conditions which have a bearing on the performance characteristics of the sensors 102 and other conditions that may influence the importance of sensor data 115 from one sensor over another. In addition, the sensor selection component 120 prioritizes, through either a weighting or selection process, each of the sensors 102 using a set of sensor priority rules that are based on expected performance characteristics of each of the sensors 102 in the detected conditions. Components of the SDV control system 100, such as the localization component 122, perception component 124, prediction engine 126, and motion planning logic 130, can use the resulting sensor priority 127 to weight or select sensor data 115 when analyzing the current sensor state to perform vehicle operations.

Conditions which have a bearing on the performance characteristics of the sensors of the SDV 10 or that may influence the importance of sensor data 115 can include operating parameters of the SDV 10 itself and the state of the surrounding environment, such as the weather and current road conditions. Some examples of operating parameters of the SDV 10 are the speed of the vehicle, acceleration, direction of movement (i.e., forward or reverse), traction, sensor status, and vehicle status (i.e., parked or moving). Some examples of environment conditions are current precipitation type and magnitude (e.g., heavy rain or light snow), fog, smog, haze, leaves, wind, time of day, ambient lighting, road surface type and quality, and traffic.

As described with an example of FIG. 1, the localization component 122 may provide localization output 121 (including localization coordinates and pose) to one or more components of the control system 100. The localization output 121 can correspond to, for example, a position of the vehicle within a road segment. The localization output 121 can be specific in terms of identifying, for example, any one or more of a driving lane that the SDV 10 is using, the vehicle's distance from an edge of the road, the vehicle's distance from the edge of the driving lane, and/or a travel distance from a point of reference in a particular localization map. In some examples, the localization output 121 can determine the relative location of the SDV 10 within a road segment, as represented by a localization map.

Additionally, the perception component 124 may signal perception output 129 to one or more components of the control system 100. The perception output 129 may utilize, for example, a perception layer to subtract objects which are deemed to be persistent from the current sensor state of the vehicle. Objects which are identified through the perception component 124 can be perceived as being static or dynamic, with static objects referring to objects which are persistent or permanent in the particular geographic region. The perception component 124 may, for example, generate perception output 129 that is based on sensor data 115 which exclude predetermined static objects. The perception output 129 can correspond to interpreted sensor data, such as (i) image, sonar or other electronic sensory-based renderings of the environment, (ii) detection and classification of dynamic objects in the environment, and/or (iii) state information associated with individual objects (e.g., whether the object is moving, pose of the object, direction of the object). The perception component 124 can interpret the sensor data 115 for a given sensor horizon. In some examples, functionality provided by the perception component 124 can be centralized, such as being performed with a processor or combination of processors in a central portion of the vehicle. In other examples, the perception component 124 can be distributed, such as onto the one or more of the sensor interfaces 110, 112, 114, such that the outputted sensor data 115 can include perceptions.

The perception output 129 can provide input into the motion planning component 130. The motion planning component 130 includes logic to detect dynamic objects of the vehicle's environment from the perceptions. When dynamic objects are detected, the motion planning component 130 may utilize the location output 121 of the localization component 122 to determine a response trajectory 125 of the vehicle for steering the vehicle outside of the current sensor horizon. The response trajectory 125 can be used by the vehicle control interface 128 in advancing the vehicle forward safely.

The route planner 142 can determine a route 143 for a vehicle to use on a trip. In determining the route 143, the route planner 142 can utilize a map database, such as provided over a network through a map service 199. Based on input such as destination and current location (e.g., such as provided through GPS), the route planner 142 can select one or more route segments that collectively form a path of travel for the SDV 10 when the vehicle in on a trip. In one implementation, the route planner 142 can determine route input 144 (e.g., route segments) for a planned route 143, which in turn can be communicated to the vehicle control 128.

In some aspects, the vehicle control interface 128 represents logic that controls the vehicle with respect to steering, lateral and forward/backward acceleration, and other parameters in response to determinations of various logical components of the control system 100. The vehicle control interface 128 can include a route following component 167 and a trajectory following component 169. The route following component 167 can receive route input 144 from the route planner 142. Based at least in part on the route input 144, the route following component 167 can output trajectory components 175 for the route 143 to the vehicle control interface 128. The trajectory following component 169 can receive the trajectory components 175 of the route following component 167, as well as the response trajectory 125, in controlling the vehicle on a vehicle trajectory 179 of route 143. At the same time, the response trajectory 125 enables the SDV 10 to make adjustments to predictions of the prediction engine 126. The vehicle control interface 128 can generate commands 158 as output to control components of the SDV 10. The commands can further implement driving rules and actions based on various context and inputs.

According to some examples, the localization output 121 can be utilized by, for example, the prediction engine 126, and/or vehicle control 128, for purpose of detecting potential points of interference or collision on the portion of the road segment in front of the vehicle. The localization output 121 can also be used to determine whether detected objects can collide or interfere with the SDV 10, and to determine response actions for anticipated or detected events. Either of the route following component 167 and trajectory following component 169 can also use the localization output 121 to make precise determinations for routes and trajectories.

With respect to an example of FIG. 1, the vehicle control interface 128 implements event logic 174 to detect avoidance events (e.g., a collision event) and to trigger a response to a detected event. An avoidance event can correspond to a roadway condition or obstacle which poses a potential threat of collision to the SDV 10. By way of example, an avoidance event can include an object in the road segment, heavy traffic in front of the vehicle, and/or wetness or other environmental conditions on the road segment. The event logic 174 can use the perception output 129 as generated from the perception component 128 in order to detect events, such as the sudden presence of objects or road conditions which may collide with the SDV 10. For example, the event logic 174 can detect potholes, debris, and even objects which are on a trajectory for collision. Thus, the event logic 174 detects events which, if perceived correctly, may in fact require some form of evasive action or planning.

When events are detected, the event logic 174 can signal an event alert 135 that classifies the event and indicates the type of avoidance action which should be performed. For example, an event can be scored or classified between a range of likely harmless (e.g., small debris in roadway) to very harmful (e.g., vehicle crash may be imminent). In turn, the route following component 167 can adjust the vehicle trajectory 179 of the vehicle to avoid or accommodate the event. For example, the route following component 167 can output an event avoidance action, corresponding to a trajectory altering action that the SDV 10 should perform to effect a movement or maneuvering of the SDV 10. By way of example, the vehicle response can include slight or sharp vehicle maneuvering for avoidance, using a steering control mechanism, and/or using a braking component. The event avoidance action can be signaled through the commands 158 for the vehicle control mechanisms 170.

When an anticipated dynamic object of a particular class does in fact move into position of likely collision or interference, some examples provide that event logic 174 can signal the event alert 135 to cause the vehicle control 128 to generate commands 158 that correspond to the event avoidance action. For example, in the event of a bicycle crash in which the bicycle (or bicyclist) falls into the path of the SDV 10, event logic 174 can signal the event alert 135 to avoid the collision. The event alert 135 can indicate (i) a classification of the event (e.g., "serious" and/or "immediate"), (ii) information about the event, such as the type of object that generated the event alert 135, and/or information indicating a type of action the SDV 10 should take (e.g., location of object relative to path of vehicle, size or type of object).

Figure 2:
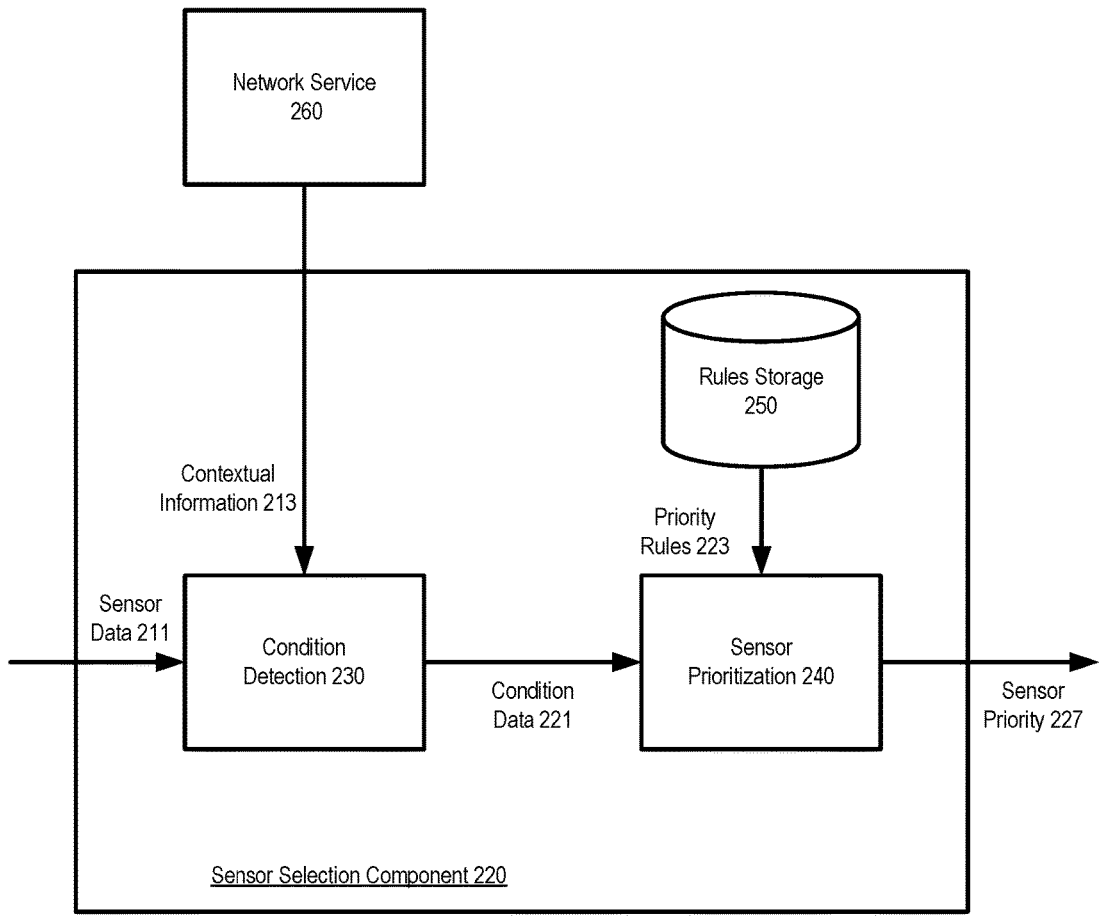
FIG. 2 is a block diagram illustrating an example sensor selection component utilized in connection with a self-driving vehicle, according to examples described herein.

FIG. 2 is a block diagram illustrating an example sensor selection component 220 utilized in connection with a self-driving vehicle, according to examples described herein. In the context of the example SDV 10 illustrated in FIG. 1, the sensor selection component 220 of FIG. 2 can represent the sensor selection component 120 of the control system 100. In some examples, the sensor selection component 220 includes condition detection logic 230 to detect one or more conditions relating to operating the SDV and sensor prioritization logic 240 to prioritize sensor data 211 from a selected set of sensors based on the detected conditions. Other components of the vehicle control system can then control operations of the SDV based on the prioritized sensor data 211. Although illustrated as discrete components in FIG. 2, logic and functionality attributed to the sensor selection component 220, condition detection logic 230, and sensor prioritization logic 240 can be distributed throughout other systems of the SDV 10, such as the control system 100 and sensor interfaces 110, 112, 114.

The condition detection logic 230 performs functions to detect conditions which have a bearing on the performance characteristics of the sensors of the SDV and other conditions that may influence the importance of data from one sensor over another. In order to safely operate, the SDV relies on sensor data 211 to be sufficiently accurate to allow for object detection, object classification, object prediction, localization, and other features in real time while the SDV navigates through an environment. Accordingly, the SDV is equipped with a sensor array comprising different types of sensors, each of which performs better or worse depending on the current conditions. In addition, each type of sensor and its supporting interface, software, and firmware can be designed, equipped, or tuned to maximize that sensor's strengths since a different sensor or set of sensors are available to provide accurate sensor data 211 in conditions where the first sensor is less reliable. For example, LIDAR sensors can be optimized to function at low to moderate vehicle speeds on an SDV equipped with radar and stereo cameras that are optimized to function at higher speeds.

Conditions which have a bearing on the performance characteristics of the sensors of the SDV or that may influence the importance of sensor data 211 can include operating parameters of the SDV itself and the state of the surrounding environment, such as the weather and current road conditions. Some examples of operating parameters of the SDV are the speed of the vehicle, acceleration, direction of movement (i.e., forward or reverse), traction, sensor status, and vehicle status (i.e., parked or moving). Some examples of environment conditions are current precipitation type and magnitude (e.g., heavy rain or light snow), fog, smog, haze, leaves, wind, time of day, ambient lighting, road surface type and quality, and traffic.

The condition detection logic 230 detects many types of conditions by analyzing the sensor data 211 that the various sensors of the SDV produce. For example, a stereo camera on the SDV can provide images that show weather conditions. Sensors useful for condition detection include not only the SDV sensors used for perception, prediction, and motion planning, but also vehicle sensors such as a wheel speed sensor, throttle position sensor, ambient air temperature sensor, air pressure sensor, rain sensor, etc. At programmed intervals or time or when changes in the current conditions are detected, the condition detection logic 230 can send corresponding condition data 221 to the sensor prioritization logic 240.

According to one aspect, vehicle sensor interfaces obtain raw sensor data from the various sensors, and sensor analysis components of the vehicle control system implement functionality such as object detection, image recognition, image processing, and other sensor processes in order to detect hazards, objects, or other notable events in the roadway. The sensor analysis components can be implemented by multiple different processes, each of which analyzes different sensor profile data sets. In this aspect, the condition detection logic 230 receives the analyzed sensor data 211 from the sensor analysis components. Therefore, the condition detection logic 230 can detect conditions based on not only raw sensor data 211, but also analyzed sensor data 211.

In some aspects, the SDV stores recent sensor data 211 for an interval of time. Condition detection logic 230 can compare current sensor data 211 with the stored data from previous frames or seconds in order to more accurately detect conditions. The condition detection logic 230 can apply heuristics across the stored and current sensor data 211 to determine whether a condition exists above a reasonable probability threshold. For example, the condition detection logic 230 can wait until multiple sensors detect rain for a few seconds before including the rainy weather condition in the condition data 221.

In some cases, the sensors, interfaces, or control system may detect faults or performance degradation in specific sensors, the compute stack of the vehicle, or from a mechanical system of the vehicle itself. Depending on the severity of the fault or degradation, the condition detection logic 230 can treat the sensor data 211 coming from any affected sensor as junk data to ignore or as degraded data to be given lower priority.

In addition to detecting conditions from the sensor data 211, the condition detection logic 230 can receive contextual information 213 from a network service 260. A region-specific network service 260 can record location-based contextual information 213 about a region, and a combination of sensor data 211 and position information of the SDV can be correlated to accurately determine environment conditions. By way of example, contextual information 213 can include labels or descriptors, or numeric equivalents or correlations of parameters, which indicate one or more of the following: road construction, traffic, emergency situations, local weather, time and date, accumulated precipitation on road surfaces, etc.

As an addition or variation, the condition detection logic 230 includes processes which can compare sensor data 211 with feature sets of corresponding localization maps for the area of a road network. The condition detection logic 230 can compare objects and features of the vehicle's scene, road surface conditions/features, and lighting conditions from the sensor data 211 with the localization map. The condition detection logic 230 can then recognize when a classified and/or recognized feature from the sensor data 211 is new or different as compared to the feature set of the localization map and use this information in order to detect the presence of weather and other conditions that may adversely affect the vehicle sensors.

Sensor prioritization logic 240 operates to prioritize the sensor data 211 generated from the sensors of the SDV based on the conditions detected by the condition detection logic 230. In some aspects, the sensor prioritization logic 240 applies a set of priority rules 223 to the condition data 221 in order to calculate a set of values for sensor priority 227.

In general, priority rules 223 are based on expected performance characteristics of each of the sensors in various vehicle conditions and environment conditions. These performance characteristics can be determined from a combination of technical specifications for the sensors and testing performed with each of the sensors in the relevant conditions. In one example, a fleet of self-driving vehicles equipped with sensors sends their sensor data, current conditions, and results of analysis performed on the sensor data to the network service 260. Processes implemented on hardware at the network service 260 can then determine the performance characteristics of each of the sensors in the conditions in order to create priority rules 223. The priority rules 223 can therefore be created by algorithms that take the technical specifications for the sensors and the results of the test data into account. In addition or in alternative implementations, priority rules 223 are manually created based on the technical specifications for the sensors and the results of the test data. Furthermore, hardware, firmware, and software that comprise the sensors, sensor interfaces, and compute stack of the vehicle control system can be updated to change the performance characteristics of the sensors. If the performance characteristics of the sensors change significantly, the priority rules 223 can also be updated either manually or algorithmically based on new testing data and technical specifications.

The sensor prioritization logic 240 retrieves priority rules 223 from a rules storage location 250, such as a database, ROM, or RAM included in the vehicle control system. Additionally, priority rules 223 can be retrieved from the network service 260, either directly over a network or through periodic updates to the rules storage 250. In other examples, the priority rules 223 are updated with software updates performed either locally on the SDV or remotely from the network service 260 over a network.

Priority rules 223 are written to select the most accurate and reliable sensors for vehicle operations such as object detection, object classification, object prediction, localization, etc. under the detected conditions from the condition data 221. Given that an SDV needs to perform these operations in real time, sensor accuracy and reliability are also subject to the computational time required to process sensor data 211 from each type of sensor. Therefore, in some conditions, the sensor prioritization logic 240 may prioritize a less accurate sensor which provides sensor data 211 that can be processed quickly over a more accurate sensor which provides sensor data 211 that would take too long to process in the current conditions (e.g., the vehicle traveling at a high speed).

In some aspects, the SDV is equipped with a sensor array comprising different types of sensors that compensate for the weaknesses of other types of sensors. For example, radar systems may be incorporated to complement other sensor systems, such as LIDAR, image capturing systems (e.g., monocular or stereoscopic cameras), proximity sensors, sonar systems, and the like. While LIDAR and image capturing systems have significant advantages in positioning and angular surveying, they are comparatively insensitive in providing relative velocity data of objects of interest. Furthermore, LIDAR and image capturing systems are sensitive to inclement weather conditions (e.g., fog, mist, rain, or snow), whereas radar systems are largely invariant to such conditions. This makes radar useful in cross-validation of perception and prediction processes in the SDV control system and detection of distant objects of interest before detection by other sensor systems. Additional examples recognize that with respect to passive image sensor data 211, image analysis may be negatively affected by lighting conditions or environment conditions which may impact the appearance of objects.

Among other conditions, priority rules 223 can determine the sensor priority 227 based on the current speed of the vehicle. One example prioritization rule 223 prioritizes the vehicle's LIDAR sensor at low to moderate driving speeds (e.g., under 35 miles per hour). Another example prioritization rule 223 prioritizes the vehicle's radar and stereo camera at higher driving speeds (e.g., 35 miles per hour and above). If the vehicle is currently stopped, the sensor prioritization logic 240 can prioritize sensor data 211 from ultrasonic sensors until the vehicle reaches a certain speed or travels beyond any potential blind spots in the other sensors that may exist due to the sensors' placement on the vehicle. For example, sensors on top of the vehicle are not able to detect objects within a few feet of the vehicle, and therefore the ultrasonic sensors can be used to determine whether it is safe to initiate motion.

In one aspect, the sensor priority 227 represents a set of values that weight the sensor data 211 coming from each of the vehicle's sensors. For example, the sensor prioritization logic 240 may weight one sensor at 100% when that sensor is optimal (or superior to the other available sensors) in the current conditions. In another example, the sensor prioritization logic 240 may weight one sensor at 50% when that sensor is sub-optimal, but still provides partially reliable sensor data, in the current conditions. In a further example, the sensor prioritization logic 240 may weight one sensor at 0% when that sensor is deemed unreliable in the current conditions. In other aspects, the sensor priority 227 is a set of flags that components of the vehicle control system can use to select which of the vehicle's sensors provide sensor data 211 for operations such as object detection, object classification, object prediction, localization, and other features. Nevertheless, sensor data 211 from sensors that are not selected in the sensor priority 227 can still be collected, stored, and used for other purposes.

Methodology

Figure 3:
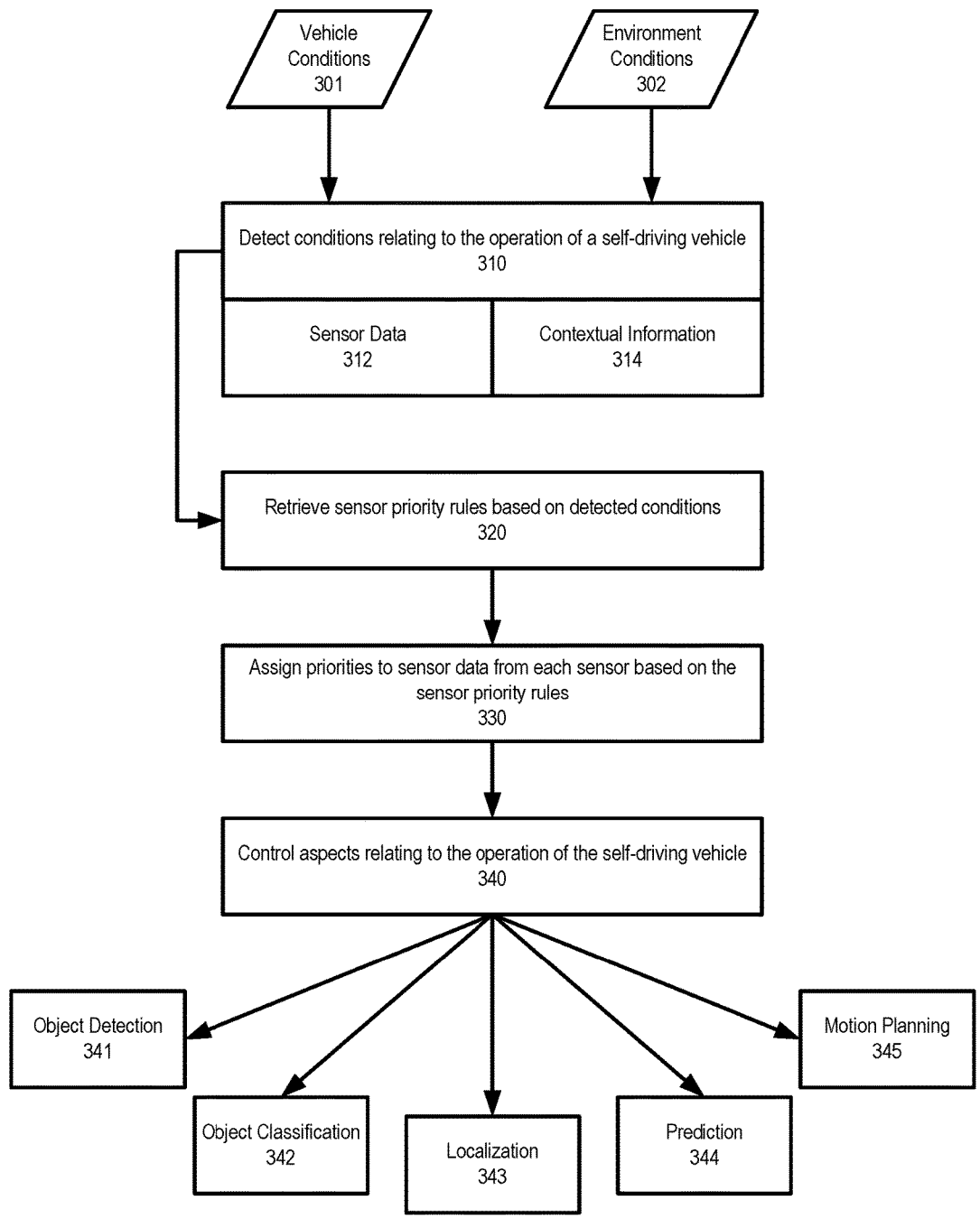
FIG. 3 is a flow chart describing an example method of operating a self-driving vehicle using dynamic sensor selection, according to examples described herein.

FIG. 3 a flow chart describing an example method of operating a self-driving vehicle using dynamic sensor selection, according to examples described herein. Reference may be made to features as shown and described with respect to FIGS. 1 and 2. Furthermore, the individual processes discussed with respect to FIG. 3 may be performed by an example SDV control system 100 implementing a sensor selection component 120, 220 as shown and described in FIGS. 1 and 2. Accordingly, in the below description, reference may be made interchangeably to the SDV 10 in general and/or the SDV control system 100 implementing the sensor selection component 120, 220 of FIGS. 1 and 2. It is contemplated that a particular step described either individually or as part of an additional step can be combined or omitted from other individually described steps of the flow chart.

Referring to FIG. 3, condition detection logic 230 performs functions to detect conditions which have a bearing on the performance characteristics of the sensors of the SDV and other conditions that may influence the importance of data from one sensor over another (310). In order to safely operate, the SDV relies on sensor data (312) to be sufficiently accurate to allow for object detection, object classification, object prediction, localization, and other features in real time while the SDV navigates through an environment. Accordingly, the SDV is equipped with a sensor array comprising different types of sensors, each of which performs better or worse depending on the current conditions.

Conditions which have a bearing on the performance characteristics of the sensors of the SDV or that may influence the importance of sensor data can include operating parameters of the SDV itself and the state of the surrounding environment, such as the weather and current road conditions. Some examples of vehicle conditions (301) are the speed of the vehicle, acceleration, direction of movement (i.e., forward or reverse), traction, sensor status, and vehicle status (i.e., parked or moving). Some examples of environment conditions (302) are current precipitation type and magnitude (e.g., heavy rain or light snow), fog, smog, haze, leaves, wind, time of day, ambient lighting, road surface type and quality, and traffic.

In addition to detecting conditions from the sensor data, the condition detection logic 230 can receive contextual information (314) from a network service 260. A region-specific network service 260 can record location-based contextual information about a region, and a combination of sensor data and position information of the SDV can be correlated to accurately determine environment conditions. By way of example, contextual information can include labels or descriptors, or numeric equivalents or correlations of parameters, which indicate one or more of the following: road construction, traffic, emergency situations, local weather, time and date, accumulated precipitation on road surfaces, etc.

Sensor prioritization logic 240 retrieves a set of sensor priority rules that match the detected conditions (320). Priority rules are written to select the most accurate and reliable sensors for vehicle operations under the detected conditions from the condition data. Given that an SDV needs to perform these operations in real time, sensor accuracy and reliability are also subject to the computational time required to process sensor data from each type of sensor.

Sensor prioritization logic 240 assigns priorities to sensor data from each sensor based on the retrieved sensor priority rules (330). In one aspect, the assigned priorities represent a set of values that weight the sensor data coming from each of the vehicle's sensors. For example, the sensor prioritization logic 240 may weight one sensor at 100% when that sensor is optimal (or superior to the other available sensors) in the current conditions. In another example, the sensor prioritization logic 240 may weight one sensor at 50% when that sensor is sub-optimal, but still provides partially reliable sensor data, in the current conditions. In a further example, the sensor prioritization logic 240 may weight one sensor at 0% when that sensor is deemed unreliable in the current conditions. In other aspects, the sensor priority is a set of flags that components of the vehicle control system can use to select which of the vehicle's sensors provide sensor data for operations.

Components of the vehicle control system 100 can then apply the sensor priority weights or selections to generated sensor data in order to control aspects relating to the operation of the self-driving vehicle (340). Such aspects include object detection (341), object classification (342), localization (343), prediction (344), and motion planning (345), among other functions and processes that the vehicle control system 100 performs to safely navigate the SDV through an environment.

Hardware Diagrams

Figure 4:
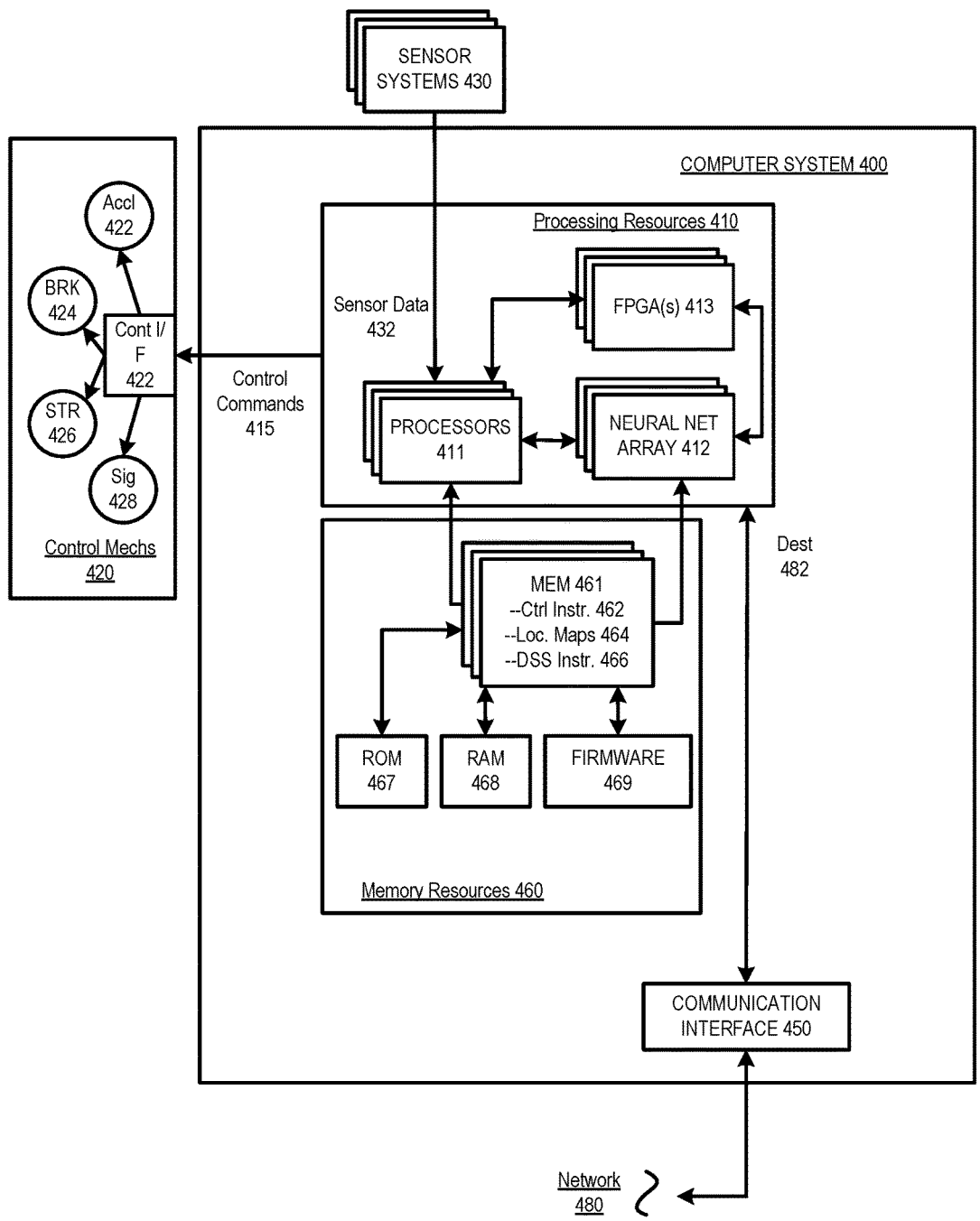
FIG. 4 is a block diagram illustrating a computer system for a self-driving vehicle upon which examples described herein may be implemented.

FIG. 4 is a block diagram illustrating a computer system upon which example SDV processing systems described herein may be implemented. The computer system 400 can be implemented using a number of processing resources 410, which can comprise processors 411, field programmable gate arrays (FPGAs) 413. In some aspects, any number of processors 411 and/or FPGAs 413 of the computer system 400 can be utilized as components of a neural network array 412 implementing a machine learning model and utilizing road network maps stored in memory 461 of the computer system 400. In the context of FIGS. 1 and 2, various aspects and components of the control system 100, 205, route planning engine 160, 285, and perception and prediction engines 140, 215, 220, can be implemented using one or more components of the computer system 400 shown in FIG. 4.

According to some examples, the computer system 400 may be implemented within an autonomous vehicle or self-driving vehicle (SDV) with software and hardware resources such as described with examples of FIGS. 1 and 2. In an example shown, the computer system 400 can be distributed spatially into various regions of the SDV, with various aspects integrated with other components of the SDV itself. For example, the processing resources 410 and/or memory resources 460 can be provided in a cargo space of the SDV. The various processing resources 410 of the computer system 400 can also execute control instructions 462 using microprocessors 411, FPGAs 413, a neural network array 412, or any combination of the same.

In an example of FIG. 4, the computer system 400 can include a communication interface 450 that can enable communications over a network 480. In one implementation, the communication interface 450 can also provide a data bus or other local links to electro-mechanical interfaces of the vehicle, such as wireless or wired links to and from control mechanisms 420 (e.g., via a control interface 422), sensor systems 430, and can further provide a network link to a backend transport management system (implemented on one or more datacenters) over one or more networks 480. For example, the processing resources 410 can receive a destination 482 over the one or more networks 480, or via a local user interface of the SDV.

The memory resources 460 can include, for example, main memory 461, a read-only memory (ROM) 467, storage device, and cache resources. The main memory 461 of memory resources 460 can include random access memory (RAM) 468 or other dynamic storage device, for storing information and instructions which are executable by the processing resources 410 of the computer system 400. The processing resources 410 can execute instructions for processing information stored with the main memory 461 of the memory resources 460. The main memory 461 can also store temporary variables or other intermediate information which can be used during execution of instructions by the processing resources 410. The memory resources 460 can also include ROM 467 or other static storage device for storing static information and instructions for the processing resources 410. The memory resources 460 can also include other forms of memory devices and components, such as a magnetic disk or optical disk, for purpose of storing information and instructions for use by the processing resources 410. The computer system 400 can further be implemented using any combination of volatile and/or non-volatile memory, such as flash memory, PROM, EPROM, EEPROM (e.g., storing firmware 469), DRAM, cache resources, hard disk drives, and/or solid state drives.

The memory 461 may also store localization maps 464 in which the processing resources 410—executing the control instructions 462—continuously compare to sensor data 432 from the various sensor systems 430 of the SDV. Execution of the control instructions 462 can cause the processing resources 410 to generate control commands 415 in order to autonomously operate the SDV's acceleration 422, braking 424, steering 426, and signaling systems 428 (collectively, the control mechanisms 420). Thus, in executing the control instructions 462, the processing resources 410 can receive sensor data 432 from the sensor systems 430, dynamically compare the sensor data 432 to a current localization map 464, and generate control commands 415 for operative control over the acceleration, steering, and braking of the SDV. The processing resources 410 may then transmit the control commands 415 to one or more control interfaces 422 of the control mechanisms 420 to autonomously operate the SDV through road traffic on roads and highways, as described throughout the present disclosure.

The memory 461 may also store dynamic sensor selection instructions 466 that the processing resources 410 can execute to detect conditions and prioritize sensor data based on the detected conditions. Thereafter, the processing resources 410 can generate control commands 415 to cause the control mechanisms 420 to autonomously operate the SDV along the current route or an alternate route accordingly.

Figure 5:
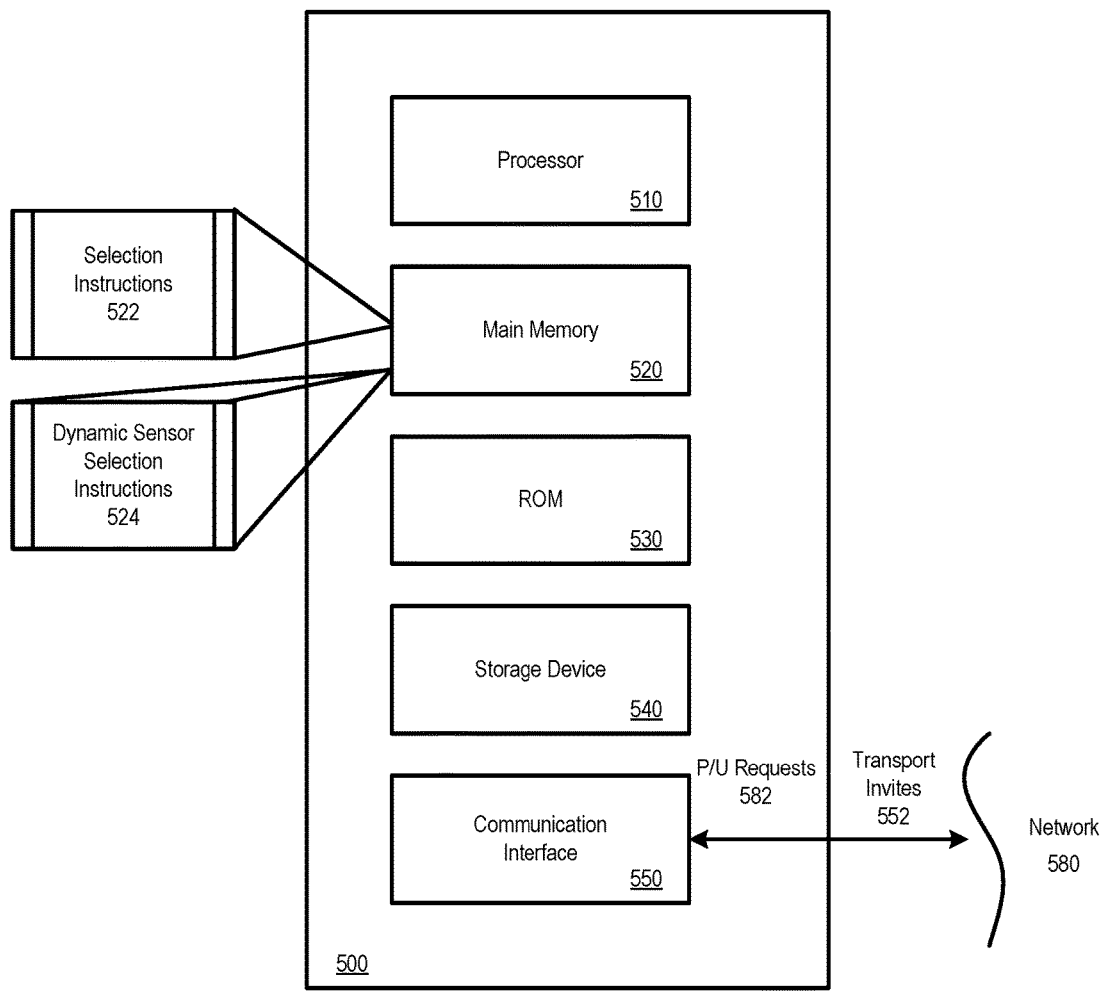
FIG. 5 is a block diagram illustrating a computer system for a backend datacenter upon which example transport systems described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services. In the context of FIGS. 1 and 2, the map service 199 or network service 260 may be implemented using a computer system 500 such as described by FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate over one or more networks 580 (e.g., cellular network) through use of the network link (wireless or wired). Using the network link, the computer system 500 can communicate with one or more computing devices, one or more servers, and/or one or more self-driving vehicles. In accordance with examples, the computer system 500 can receive pick-up requests 582 from mobile computing devices of individual users. The executable instructions stored in the memory 530 can include selection instructions 522, which the processor 510 executes to select an optimal driver or SDV to service the pick-up request 582. In doing so, the computer system can receive vehicle locations of drivers and SDVs operating throughout the given region, and the processor can execute the selection instructions 522 to select an optimal driver or SDV from a set of available vehicles, and transmit a transport invitation 552 to enable the driver to accept or decline the ride service offer, or to instruct the matched SDV to rendezvous with the requesting user.

The executable instructions stored in the memory 520 can also include dynamic sensor selection instructions 524 to, for example, instruct computer system 500 to provide data to a self-driving vehicle including performance characteristics of vehicle sensors, contextual information regarding conditions, sensor priority rules, etc.

By way of example, the instructions and data stored in the memory 520 can be executed by the processor 510 to implement an example map service 199 or network service 260 of FIGS. 1 and 2. In performing the operations, the processor 510 can receive pick-up requests 582 and submit transport invitations 552 to facilitate the servicing of the requests 582.

The processor 510 is configured with software and/or other logic to perform one or more processes, steps, and other functions described with implementations, such as described with respect to FIGS. 1-3 and elsewhere in the present application. Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein.

In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A self-driving vehicle (SDV) comprising:
   a plurality of sensors generating sensor data indicative one or more views of a surrounding area of the SDV; and
   a control system to execute instructions that cause the control system to:
      detect one or more conditions relating to an operation of the SDV;
      select a set of sensors from the plurality of sensors based on performance characteristics of each of the plurality of sensors associated with the detected one or more conditions; and
      prioritize the sensor data generated from the selected set of sensors to control one or more aspects relating to the operation of the SDV based on the performance characteristics of each of the plurality of sensors in the detected one or more conditions relating to the operation of the SDV.

2. The SDV of claim 1, wherein detecting the one or more conditions includes receiving contextual information from a network service over a network.

3. The SDV of claim 1, wherein the control system detects the one or more conditions by analyzing the sensor data.

4. The SDV of claim 1, wherein the one or more conditions relating to the operation of the SDV include weather conditions, current speed of the SDV, time of day, ambient lighting, and road conditions.

5. The SDV of claim 1, wherein a plurality of sensor priority rules are applied to the detected one or more conditions to select the set of sensors.

6. The SDV of claim 5, wherein the plurality of sensor priority rules include one or more weights to apply to the sensor data from one or more of the plurality of sensors, and the control system prioritizes the sensor data based on the one or more weights.

7. The SDV of claim 6, wherein the plurality of sensor priority rules and/or the one or more weights are based on the performance characteristics of each of the plurality of sensors in a plurality of conditions relating to the operation of the SDV.

8. The SDV of claim 1, wherein the one or more aspects relating to the operation of the SDV include detecting one or more objects in an environment around the SDV.

9. The SDV of claim 8, wherein the control system prioritizes the sensor data generated from the selected set of sensors to assign an object classification to each of the one or more objects.

10. The SDV of claim 1, wherein the one or more aspects relating to the operation of the SDV include localization, prediction, and motion planning.

11. A non-transitory computer readable medium storing instructions that, when executed by a control system of a self-driving vehicle (SDV), cause the control system to:
    detect one or more conditions relating to an operation of the SDV;
    select a set of sensors from a plurality of sensors based on performance characteristics of each of the plurality of sensors associated with the detected one or more conditions, the sensors are configured to generate sensor data indicative of one or more views of a surrounding area of the SDV; and
    prioritize the sensor data generated from the selected set of sensors to control one or more aspects relating to the operation of the SDV based on the performance characteristics of each of the plurality of sensors in the detected one or more conditions relating to the operation of the SDV.

12. The non-transitory computer readable medium of claim 11, wherein detecting the one or more conditions includes receiving contextual information from a network service over a network.

13. The non-transitory computer readable medium of claim 11, wherein the control system detects the one or more conditions by analyzing the sensor data.

14. The non-transitory computer readable medium of claim 11, wherein the one or more conditions relating to the operation of the SDV include weather conditions, current speed of the SDV, time of day, ambient lighting, and road conditions.

15. The non-transitory computer readable medium of claim 11, wherein a plurality of sensor priority rules are applied to the detected one or more conditions to select the set of sensors.

16. The non-transitory computer readable medium of claim 15, wherein the plurality of sensor priority rules include one or more weights to apply to the sensor data from one or more of the plurality of sensors, and the control system prioritizes the sensor data based on the one or more weights.

17. The non-transitory computer readable medium of claim 16, wherein the plurality of sensor priority rules and/or the one or more weights are based on the performance characteristics of each of the plurality of sensors in a plurality of conditions relating to the operation of the SDV.

18. The non-transitory computer readable medium of claim 11, wherein the one or more aspects relating to the operation of the SDV include detecting one or more objects in an environment around the SDV.

19. The non-transitory computer readable medium of claim 18, wherein the control system prioritizes the sensor data generated from the selected set of sensors to assign an object classification to each of the one or more objects.

20. A computer-implemented method of operating a self-driving vehicle (SDV), the method being performed by a control system of the SDV and comprising:
    obtaining, from a plurality of sensors onboard the SDV, sensor data indicative of one or more views of a surrounding area of the SDV;
    detecting one or more conditions relating to an operation of the SDV;

selecting a set of sensors from the plurality of sensors based on performance characteristics of each of the plurality of sensors associated with the detected one or more conditions; and prioritizing sensor data generated from the selected set of sensors to control one or more aspects relating to the operation of the SDV based on the performance characteristics of each of the plurality of sensors in the detected one or more conditions relating to the operation of the SDV.

* * * * *